(12) United States Patent
Schilder (10) Patent No.: US 7,757,080 B1
(45) Date of Patent: Jul. 13, 2010

(54) USER VALIDATION USING COOKIES AND ISOLATED BACKUP VALIDATION

(75) Inventor: Marius Paul Michiel Schilder, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 692 days.

(21) Appl. No.: 11/077,368

(22) Filed: Mar. 11, 2005

(51) Int. Cl.
H04L 29/06 (2006.01)

(52) U.S. Cl. .................................................... 713/162

(58) Field of Classification Search .................. 713/162
See application file for complete search history.

(56) References Cited

U.S. PATENT DOCUMENTS

| | | | |
|---|---|---|---|
| 5,636,346 A | 6/1997 | Saxe | |
| 5,724,521 A | 3/1998 | Dedrick et al. | |
| 5,845,265 A | 12/1998 | Woolston | |
| 5,918,010 A | 6/1999 | Appleman et al. | |
| 5,920,854 A | 7/1999 | Kirsch et al. | |
| 5,931,901 A | 8/1999 | Wolfe et al. | |
| 5,974,398 A | 10/1999 | Hanson et al. | |
| 6,026,368 A | 2/2000 | Brown et al. | |
| 6,044,375 A | 3/2000 | Shmueli et al. | |
| 6,061,659 A | 5/2000 | Murray | |
| 6,067,570 A | 5/2000 | Kreynin et al. | |
| 6,078,866 A | 6/2000 | Buck et al. | |
| 6,223,163 B1 | 4/2001 | Van Luchene | |
| 6,230,170 B1 | 5/2001 | Zellweger et al. | |
| 6,247,009 B1 | 6/2001 | Shiiyama et al. | |
| 6,253,189 B1 | 6/2001 | Feezell et al. | |
| 6,269,361 B1 | 7/2001 | Davis et al. | |
| 6,285,987 B1 | 9/2001 | Roth et al. | |
| 6,298,348 B1 | 10/2001 | Eldering | |
| 6,324,519 B1 | 11/2001 | Eldering | |
| 6,336,132 B2 | 1/2002 | Appleman et al. | |
| 6,421,675 B1 | 7/2002 | Ryan et al. | |
| 6,662,300 B1 * | 12/2003 | Peters | 713/182 |
| 7,234,060 B1 * | 6/2007 | Amdur et al. | 713/176 |
| 2001/0042064 A1 | 11/2001 | Davis et al. | |
| 2001/0047297 A1 | 11/2001 | Wen | |

(Continued)

FOREIGN PATENT DOCUMENTS

EP 1026610 A2 8/2000

(Continued)

OTHER PUBLICATIONS

Chris Sherman, "Google Launches AdWords Select," Feb. 20, 2002, 6 pages.

(Continued)

Primary Examiner—Nasser Moazzami
Assistant Examiner—Michael S McNally
(74) Attorney, Agent, or Firm—Morgan, Lewis & Bockius LLP (57) ABSTRACT

A system for storage of user access information is described. The user access information is used for validating a user for access data on a computer server over a network. The system may comprise an encryption module for encrypting the user access information using a function that includes data from a system from which the user has accessed the computer server as an input to generate enhanced security user access data and a storage module for storing the enhanced security user access data.

16 Claims, 5 Drawing Sheets

U.S. PATENT DOCUMENTS

| | | | |
|---|---|---|---|
| 2001/0051911 | A1 | 12/2001 | Marks et al. |
| 2002/0002509 | A1 | 1/2002 | Wagorn et al. |
| 2002/0002525 | A1 | 1/2002 | Arai et al. |
| 2002/0026359 | A1 | 2/2002 | Long et al. |
| 2002/0035536 | A1 | 3/2002 | Gellman |
| 2002/0038282 | A1 | 3/2002 | Montgomery |
| 2002/0046099 | A1 | 4/2002 | Frengut et al. |
| 2002/0046104 | A1 | 4/2002 | Kaddeche et al. |
| 2002/0077891 | A1 | 6/2002 | Castle et al. |
| 2002/0078177 | A1* | 6/2002 | Dutta ........................ 709/219 |
| 2002/0099605 | A1 | 7/2002 | Weitzman et al. |
| 2002/0111898 | A1 | 8/2002 | Numaoka et al. |
| 2002/0123988 | A1 | 9/2002 | Dean et al. |
| 2002/0165773 | A1 | 11/2002 | Natsuno et al. |
| 2002/0184097 | A1 | 12/2002 | Hijiri et al. |
| 2002/0194062 | A1 | 12/2002 | Linide |
| 2002/0198780 | A1 | 12/2002 | Kawakami et al. |
| 2003/0037334 | A1 | 2/2003 | Khoo et al. |
| 2003/0070167 | A1 | 4/2003 | Holtz et al. |
| 2003/0083937 | A1 | 5/2003 | Hasegawa et al. |
| 2003/0149618 | A1 | 8/2003 | Sender et al. |
| 2003/0163372 | A1 | 8/2003 | Kolsy |
| 2003/0216963 | A1 | 11/2003 | Ishiwaka et al. |
| 2003/0229782 | A1* | 12/2003 | Bible et al. ................. 713/155 |
| 2004/0015397 | A1 | 1/2004 | Barry et al. |
| 2004/0019523 | A1 | 1/2004 | Barry et al. |
| 2004/0044571 | A1 | 3/2004 | Bronnimann et al. |
| 2004/0054577 | A1 | 3/2004 | Inoue et al. |
| 2004/0054589 | A1 | 3/2004 | Nicholas et al. |
| 2004/0059708 | A1 | 3/2004 | Dean et al. |
| 2004/0059712 | A1 | 3/2004 | Dean et al. |
| 2004/0093327 | A1 | 5/2004 | Anderson et al. |
| 2004/0093620 | A1 | 5/2004 | Iino et al. |
| 2004/0119740 | A1 | 6/2004 | Chang et al. |
| 2004/0143499 | A1 | 7/2004 | Dietsch et al. |
| 2004/0143843 | A1 | 7/2004 | Khoo et al. |
| 2004/0167928 | A1 | 8/2004 | Anderson et al. |
| 2004/0249709 | A1 | 12/2004 | Donovan et al. |
| 2005/0065806 | A1 | 3/2005 | Harik |
| 2005/0071224 | A1 | 3/2005 | Fikes et al. |
| 2005/0096979 | A1 | 5/2005 | Koningstein |
| 2005/0131758 | A1 | 6/2005 | Desikan et al. |
| 2005/0131762 | A1 | 6/2005 | Bharat et al. |
| 2005/0144069 | A1 | 6/2005 | Wiseman et al. |
| 2005/0154887 | A1* | 7/2005 | Birk et al. ................... 713/168 |
| 2005/0216335 | A1 | 9/2005 | Fikes et al. |
| 2005/0222900 | A1 | 10/2005 | Fuloria et al. |
| 2005/0222903 | A1 | 10/2005 | Buchheit et al. |
| 2005/0222989 | A1 | 10/2005 | Haveliwala et al. |
| 2005/0223002 | A1 | 10/2005 | Agarwal et al. |

FOREIGN PATENT DOCUMENTS

| | | | |
|---|---|---|---|
| WO | WO 9900960 A1 * | 1/1999 | |
| WO | WO9900960 A1 * | 1/1999 | |
| WO | WO 0038074 | 6/2000 | |
| WO | WO 2004/042525 | 5/2004 | |

OTHER PUBLICATIONS

Google Introduces New Pricing For Popular Self-Service Online Advertising Program, http://www.google.com/press/pressrel/select.html, p. 1-2, dated Feb. 20, 2002, printed on Jul. 29, 2003.

Collection of pages from www.overture.com, printed on Jul. 29, 2003.

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

* cited by examiner

| Inputs | Username; Password; Cookie; Potion of Username, Password and/or Cookie; Padded Username, Password and/or Cookie; Salted Username, Password and/or Cookie |
|---|---|
| Key | Password; Cookie; Parts Thereof |
| Function | Hashing; HMAC; Symmetric Encryption |

USER VALIDATION USING COOKIES AND ISOLATED BACKUP VALIDATION

FIELD OF THE INVENTION

The present inventions relate to increased security for validating computer users over a network.

BACKGROUND OF THE INVENTION

Computers have used logins and passwords for a number of years for purposes of limiting user access to various systems. With the proliferation of the World Wide Web, for example, millions of computers restrict access through the use of login and password combinations. Securing login and password information at a host computer is important. If a hacker or other unvalidated person gains access to another person's username and password, that hacker or unvalidated person may be able to view private and/or confidential information and use that confidential information retrieved from the website by virtue of the username and password for a number of illicit purposes. In a typical environment, username and password information is validated at the front end of the website by the web server layer of architecture. Upon verification, the front end allows the user to gain access to various back end systems such as viewing of content, making transactions, and other functionality provided by the website. By providing the validation function at the front end, however, it is more exposed to all users of the World Wide Web for improper attempts at hacking and misuse. Further, storage of username and password verification information typically involves limited encryption, for instance encryption with limited entropy.

These and other drawbacks exist with current systems and methods.

SUMMARY OF THE INVENTION

Accordingly, various embodiments of the present inventions may be directed to a system for storage of user access information for validation of a user to access data on a computer server over a network. The system may comprise an encryption module for encrypting the user access information using a function that includes data from a system from which the user has accessed the computer server as an input to generate enhanced security user access data and a storage module for storing the enhanced security user access data. As used herein, the term encryption may be understood to include any technique that results in obfuscation of data, including one-way functions such as hashing.

Other advantages and embodiments of the present invention may be appreciated from the descriptions and figures herein.

DETAILED DESCRIPTION OF EXEMPLARY EMBODIMENTS

According to an embodiment of the present invention, a system and method are provided for validating a user that provides improved security of data and improved data isolation. To enhance the security of login/password data, an encryption algorithm (e.g., hash function) may be utilized. Effectiveness of the encryption algorithms may be improved upon, as described herein, by taking as input additional information placed in a file, such as a cookie, on the user's computer. In one example, a password may be hashed along with a portion or all of the contents of a cookie file stored on the user's computer. Accordingly, when a user visits the system and is prompted to provide a username and password, the cookie from the user's machine associated with that system would be provided and used as part of the validation algorithm. If a cookie is not available, then the front end web server may pass the validation functionality to an isolated back end system. In this embodiment, the back end system responsible for user validation may be isolated from other functionality offered by the system. The back end system may then, if validating the user, create a new cookie file to be forwarded to the front end to be placed on the user's computer for use in validating that user.

By including data from a user's computer, such as a text file or cookie, the security of the user validation is significantly increased. With this technique employed, a hacker would need to attempt to include the cookie information and the password as part of its attempt to break into the system.

A hacker that gains access to the front-end, such as through an exploit in one running service, for example, that hacker will not find enough information present to successfully mount a dictionary attack against the stored encrypted passwords that are accessible by the front-end machine.

The techniques described herein provide multiple levels of protection to limit the effectiveness of the dictionary technique. Accordingly, one level of protection is provided by hashing a password with a cookie value. Cookies may include relatively arbitrary characters/data and may also or alternatively be lengthy. As a result, the likelihood that a hacker will be able to provide the correct characters given the length and/or arbitrariness of the cookie, is substantially reduced. Indeed, a cookie can be hundreds or thousands of characters long. By hashing a cookie value with a password, the entropy of the hashed value is increased substantially, making the hashed value virtually impenetrable using this technique. While this technique substantially increases the security of the data, it is transparent to the user. The user is not requested to memorize the lengthy cookie value and provide it to the system. Rather, as part of a standard protocol today, web browsers offer cookies to the web server at the URL associated with the cookie. Accordingly, unbeknownst to the user, the cookie stored on his or her computer is passed along with the username and password that the user provides. Thus, the experience to the user appears unchanged whereas the security of the system is dramatically increased.

A second level of protection may be provided by creating a backup system for validation that requests additional information from the user to receive a replacement text file (e.g., cookie) to be stored on the user's system if the initial validation failed due to a missing or invalid cookie. Thus, even if a hacker were able to provide the password at the backup system, the hacker would also have to provide the additional information to be granted the cookie used to be able to be validated at the front end and thus gain access to the contents from the website.

Accordingly, various embodiments of the present inventions may be directed to a system for storage of user access information for user in validating a user on a computer server over a network. The system may comprise an encryption module for encrypting the user access information using a function that includes data from a system from which the user has accessed the computer server as an input to generate enhanced security user access data and a storage module for storing the enhanced security user access data. The user access information may comprise a username and/or password. The function may comprise a hash function and may be applied using all or a portion of the user access information and all or a portion of the data from the system. The data from the system may comprise a text file, such as a cookie. The system may further comprise an enhanced user access module that receives user access information and uses the enhanced user access data to determine whether to grant access to data at the computer server. A secondary user access module may also be provided that receives user access information to determine whether to transmit data to the user system for use in data access communications with the computer server. The secondary access module may be isolated and may generate a cookie for transmission to the system from which the user is seeking access. It may also request the encryption module to generate enhanced user access data for the user based on the data transmitted to the user system.

According to another embodiment, the system may comprise a first validation module that receives user access information and data from a user system from which the user access request was received and determines whether to validate a user based on stored encrypted data that was generated for one or more validated users based on at least a portion of user access information and at least a portion of data from user system and a second validation module that validates a user based on at least the user access information and generates data for transmission to a user system for validation with the first validation module.

In another embodiment, the system may comprise an encryption module for encrypting a password associated with a user by hashing the password with data from a cookie stored on a system associated with the user and a storage module for storing the hashed password for use in validating the user to access data on a website.

Overview and System Architecture

Figure 1:
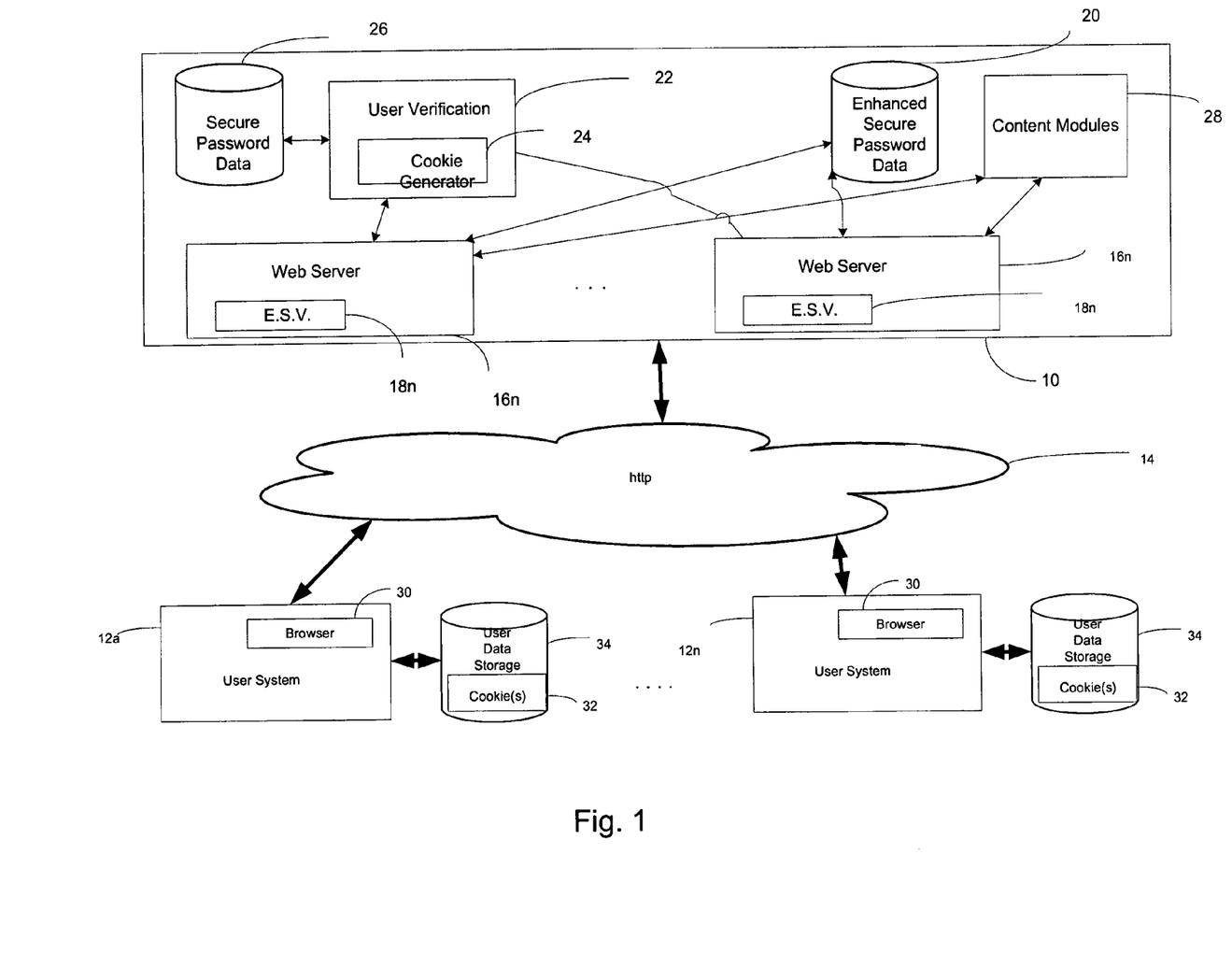
FIG. 1 depicts an overall system for securing user information according to an embodiment of the present invention.

FIG. 1 depicts an overview of a system according to an embodiment of the present invention. Specifically, a network server 10 may interact with one or more user systems 12a-12n over a network 14. In one embodiment, network server 10 may comprise one or more computer systems operating as a website. Throughout the text of this patent application, network server 10 may be referred to as a website or as a network server. It should be appreciated that whereas the term website may be used, any type of network server may also be provided. Similarly, when the term network server is used, a website should be understood to fall within the scope of that term as well. In addition, whereas the term cookie may be used as describing a text file stored in association with a user's system, it should be appreciated that other data or text files may be understood to fall within the scope of that term and may be used as described herein. For example, data stored on the hardware or in other portions of the storage devices of the user system may be provided by the browser and used in the encryption.

Similarly, user system 12 may comprise any computer system that can connect over a network to one or more server systems. Network 14 may comprise one or more network systems including the Internet, intranet, or other telecommunication or computer networks.

Network server 10 may comprise one or more components operating in cooperation to appear to a user as a website. It should be understood that the term website often refers to one or more computer systems that cooperate together to provide a functionality to users over the Internet and World Wide Web. In one embodiment, network server 10 may comprise one or more web servers 16, each of which may comprise an enhanced security validation module 18, as described in more detail below. The web servers 16 may form a first architectural layer that is exposed to the Internet such that users may interact with the web servers 18 through known protocols (e.g., http, ftp, etc.). The one or more web servers may connect to one or more additional layers of information within network server 10. In one embodiment, web server 16 may have access to an enhanced security password data structure or structures 20 in which enhanced security password data as described below may be stored. Additionally, one or more content modules 28 may be provided to deliver content, information or other types of data typically associated with network servers.

According to an embodiment of the present disclosure, an additional module may be provided as a user verification module 22. User verification module 22 may comprise a cookie generation module 24. User verification module 22 may cooperate with and have access to one or more databases such as a secure password data system 26.

Whereas one database is depicted for secure password data system 26 and enhanced secure password data system 20, it should be appreciated that data may be stored in numerous databases, file(s) and/or storage locations and accessed collectively by web servers 16 and user verification module 22, respectively.

According to one embodiment of the present invention, user verification system 22 may reside on a computer system that is separate and isolated from computer systems that provide content modules 28 and separate from the computer system on which web servers 16 reside.

User systems 12 may comprise one or more browser systems 30 to enable the user system to operate via network 14 to a network server 10. Known Internet browsers may be utilized for browser 30. In addition, user system 12 may comprise one or more user data storage systems 32 on which one or more cookies 34 may be stored. It should be appreciated that user data storage 32 may comprise hard drives, external drives, or other areas for data storage including but not limited to random access memory and read-only memory.

According to an embodiment of the present invention, a user may connect via user system 12 over the Internet 14 to a website 10. At the website 10, web server 16 may prompt the user to provide username and password information to grant the user access to certain portions of content modules 28. When the user connects via the Internet to website 10, browser 30 may provide cookie information associated with the URL of website 10. For example, if the user were accessing the website located at URL http://www.google.com/, browser 30 may search the location on user system 12 where cookie files are stored to determine whether a cookie file associated with that URL is resident. If such a cookie file is resident, the normal operation of browser 30 would be to provide the contents of the cookie information with the http request generated by the browser to website 10. Accordingly, when the user is prompted to provide username and password, and does so, website 10 is provided with the following information: the user's username and password and any information that had been stored in the cookie associated with website 10.

In one embodiment, web server 16 may provide this information to enhanced security validation module 18. Enhanced security validation module 18 may utilize the username, password, and cookie information to compare it to a value generated and stored in enhanced secure password data structure data system 20 for the input username. In particular, as described in detail below, username, password, and cookie information may be encrypted and stored in enhanced secure password data system 20 such that when the user visits the website again, that information may be used to validate the user. Enhanced security validation module 18 thus runs the encryption algorithm (e.g., hash) using the username, password, and cookie file and compares the result to the results stored in enhanced secure password data system 20.

If a match is found, then the user may be validated and granted privileges to one or more content modules 28 or otherwise granted privileges to take actions with respect to website 10. If, however, no cookie file exists on the user's system associated with the URL of website 10 or if the username, password, and cookie information may not be validated, then web server 16 and enhanced security validation module 18 may reject the attempted user validation.

Web server 16 may then relay the information to user verification module 22. User verification module 22 may attempt to validate the user through alternative techniques including requesting information that the user may have provided including credit card information, social security number, or other private and/or confidential data. If the user is validated in this step, through access to secure password data system 26, cookie generation module 24 may generate a new cookie to be relayed by web server 16 over the Internet 14 to the user system 12 for placement by user system 12 on the user data storage system 32 as a cookie file 34. On subsequent attempts by the same user, if a cookie file continues to reside on the user system and a proper username and password is provided, the user may be validated by enhanced security validation module 18 instead of user verification module 22.

In one embodiment, this system provides the advantage of validating users with enhanced level of security through the inclusion of cookie file information and the encryption process in a manner that is seamless to the user.

Additionally, if the user's cookie information is lost, in one embodiment, the user may be prompted to provide additional personal information beyond username and password. Of course it is within the scope of the present invention for user verification module 22 to validate a user based on username and password alone or other information using known techniques.

Illustrative Encryption Process

Figure 2:
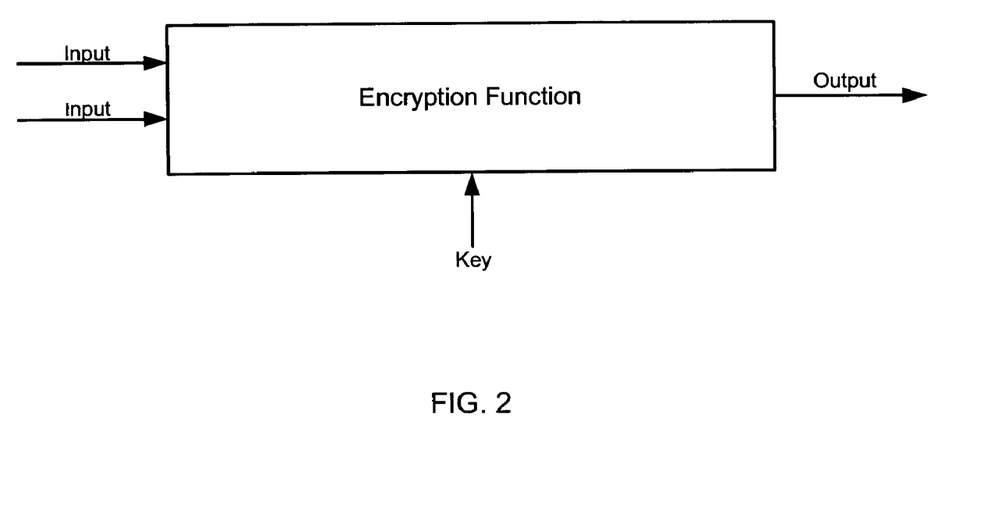
FIG. 2 depicts a schematic diagram related to encryption according to an embodiment of the present invention.

FIG. 2 depicts a schematic diagram indicating possible encryption functions. As depicted, encryption functions typically take a number of inputs and potentially one or more key values and generates an output. It should be appreciated that many encryption functions do not utilize a key.

Figure 3:
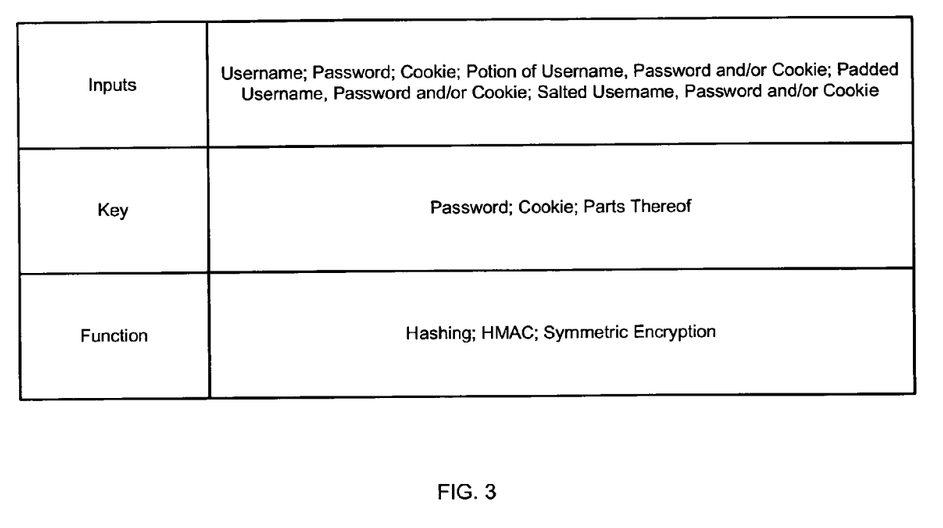
FIG. 3 depicts a table setting forth exemplary inputs, keys and functions according to an embodiment of the present invention.

As shown in FIG. 3, according to an embodiment of the present invention, the various inputs, keys and functions possible within the scope of the present invention are shown. Inputs include username; password; cookie; a portion of the username, password and/or cookie; a padded username, password and/or cookie; a salted username, password and/or cookie. The key value may be provided by the username; the password; the cookie; or parts thereof. Similarly, the key may be provided by a padded username, password and/or cookie; or a salted username, password and/or cookie. The function applied may be a hash function in general which may include the HMAC hash function or symmetric encryption for example. Any type of encryption algorithm may be utilized within the scope of the present invention.

According to one embodiment of the present invention, the password and all or part of a cookie file may all be included inputs into the encryption function to generate an enhanced hash security value for storage in enhanced security data storage 20. According to an embodiment of the present invention, the cookie value may include a predetermined number of characters which may be generated randomly or based on information to be used by the system. The addition of the data from the user's system increases security for that particular user's information. Specifically, the increase in the number of characters and/or the use of random generation of those characters decreases the likelihood that a hacker is going to be able to guess that information for purposes of hacking into the enhanced security data system using a dictionary hacking technique.

Figure 4:
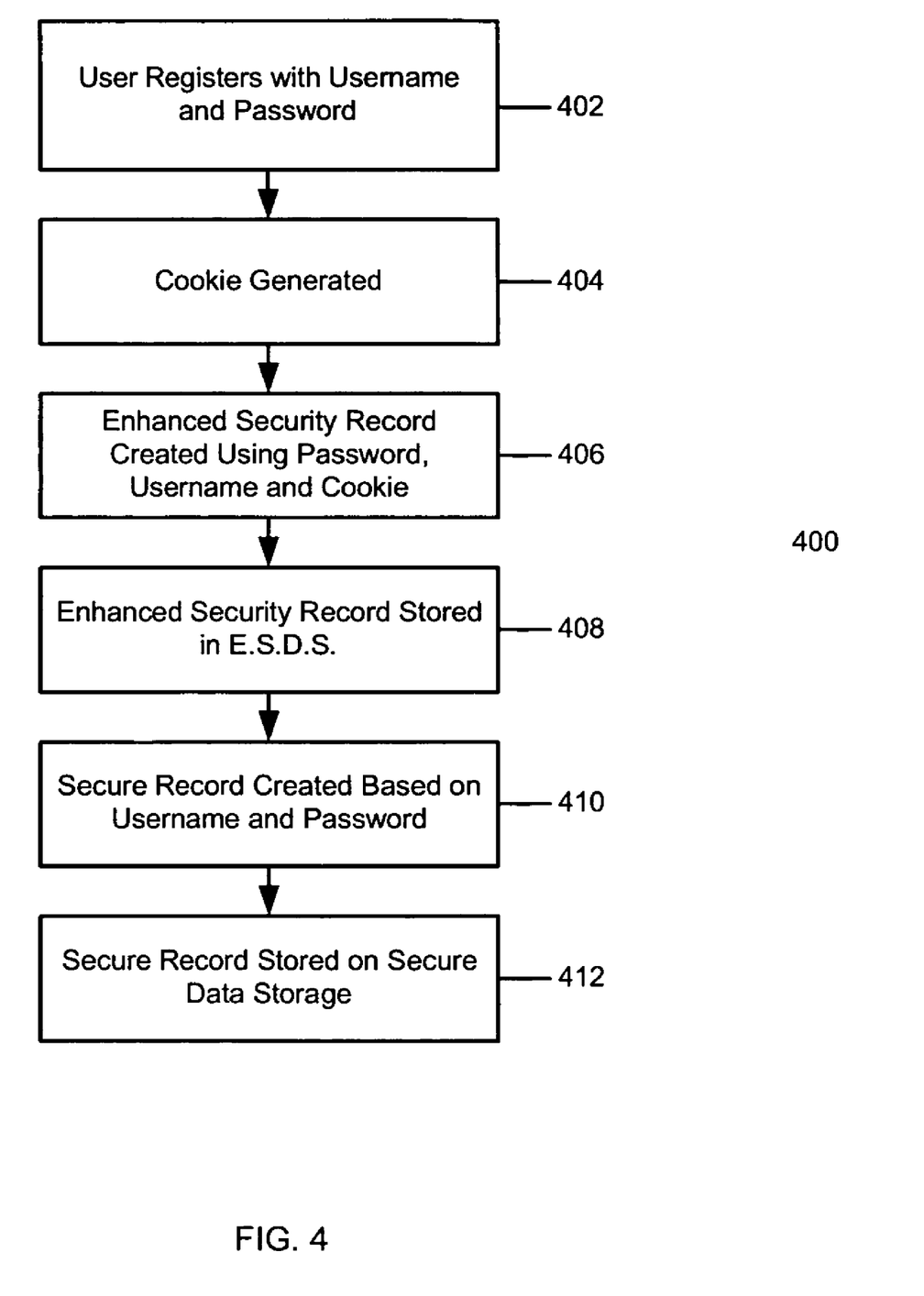
FIG. 4 depicts an embodiment of a flow for generating and storing enhanced security records according to an embodiment of the present invention.

According to one embodiment of the present invention, a method may be provided as depicted, for example, in FIG. 4. In methods 400 and 500 (described below), numerous blocks are provided and whereas they are shown in a certain sequence, it should be appreciated by one of ordinary skill in the art that a different sequence may also be utilized and that some of the blocks are optional.

In block 402, a user registers by either selecting or being provided with a username and either selecting or being provided with a password. In block 404, a cookie or other text-based file is generated. The cookie file may include information about the particular user in encrypted or hashed format. In addition, information in the cookie file may be random. Any known technique for generating cookies may be used. In block 406, an enhanced security record may be created using a combination of username, password, and/or cookie as described above. It should be appreciated that numerous different combinations are within the scope of the present invention. In addition, the method of creating the enhanced security record through encryption is also subject to many different variations as described above. In block 408, the enhanced security record may be stored in an enhanced security data storage system for later use in validating the user. In block 410, a secure record may be created based on username, password and/or other information about the user. The secure record may be stored on a secure data storage system in block 412.

Figure 5:
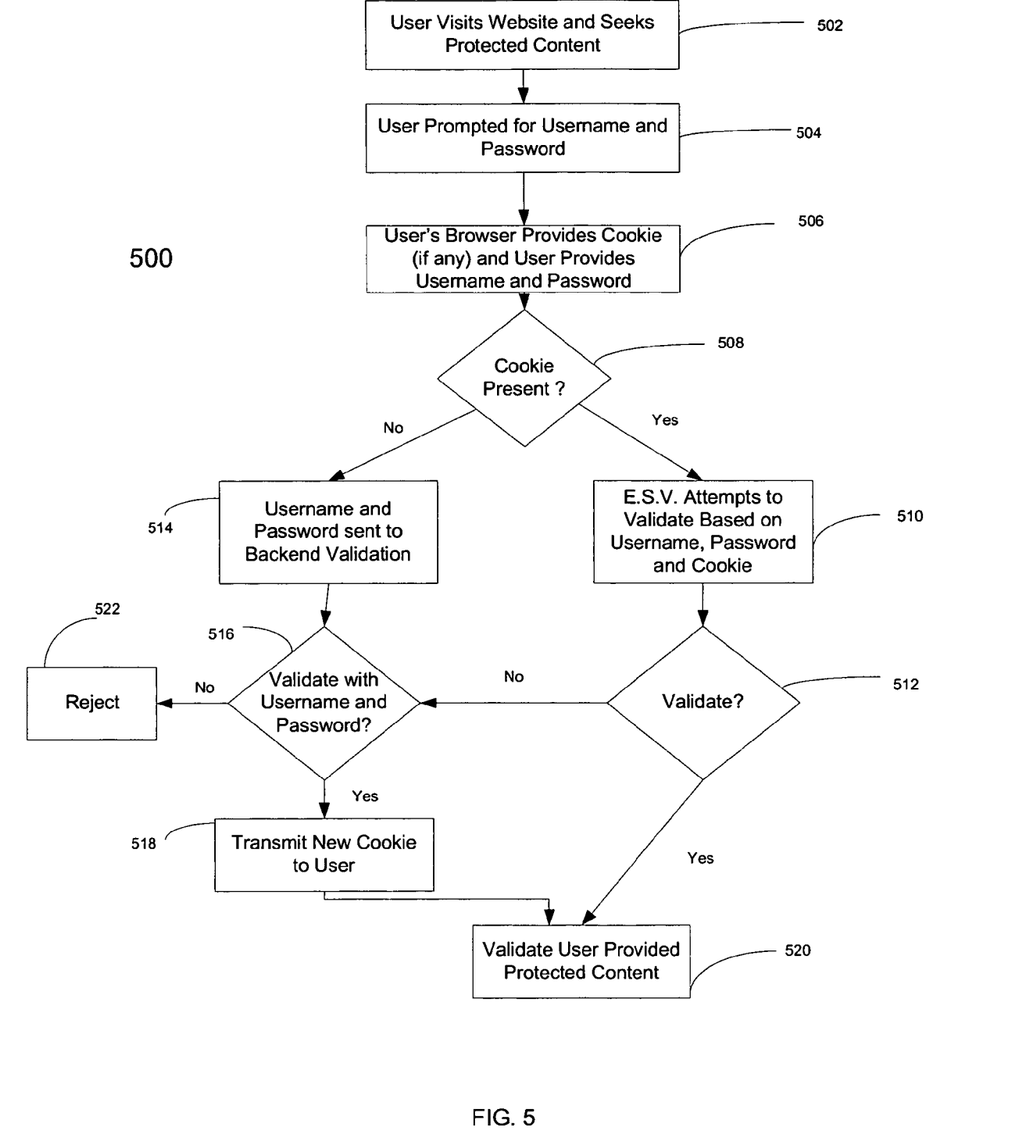
FIG. 5 depicts an exemplary method for validating a user according to an embodiment of the present invention.

With this information stored in the various data storage systems, one embodiment of a method for validating a user may be depicted which would reference to FIG. 5 as method 500. In block 502, a user visits a website or other server and seeks protected content. The request for protected content may be based on a specific selection of that content, an implied request, or other indication by the user that information that the site protects is being sought. In block 504, the user may be prompted to provide a username and password. In addition, a username and password information may be automatically provided on behalf of the user by the user system in various embodiments of the present disclosure. In block 506, the user's browser provides the cookie file if any exists for the website where the protected content is sought and username and password information is provided by the user or by the user system through an automated method. In block 508, the system determines whether or not a cookie file was received with the transmission or an earlier transmission from the same user during a predetermined period of time. If a cookie is present, then the enhanced security validation module in block 510 attempts to validate the user based on username, password, and cookie information. In particular, in one embodiment of the present invention the username, password and cookie information may be passed through the encryption algorithm used to generate an enhanced security record for the system and compared to the values stored in reference to the particular username. In block 512, the system determines whether validation is able to be made. If a validation is able to be made, then the validated user may be provided protected content in block 520.

If no cookie is present or validation fails to be made based on the provided cookie value, then in block 514 the username and password information may be sent to a back end validation process. As discussed in detail elsewhere, the back end validation process may involve username, password and/or other information. If this level of validation is not able to validate the user in block 516, then the user is rejected in block 522. If this level of validation is successful, then in block 518 a new cookie may be generated, transmitted to the user system for storage so that in future attempts the user is more likely to be validated in step 512. In block 520 after the cookie has been transmitted, the validated user may be provided protected content.

Numerous variations may also be implemented which fall within the scope of the present invention. For example, the entire cookie value may be longer than necessary to provide the desired level of entropy. Thus the cookie may be truncated or a selected portion of the cookie may be used as part of the hashing process. In addition, instead of a hash function, other encryption techniques may be used. Several encryption techniques utilize a key in order to generate the hash. The key can be provided by a portion or all of the cookie as one additional technique. Further, a portion of the password may be truncated and replaced with all or part of the cookie. And numerous combinations of the foregoing may also be possible. For example, it may be possible to truncate the password, add a portion of the cookie and use another portion of the cookie as the key to an encryption algorithm. These various combinations may be utilized to increase the entropy of the password based upon data contained or related to a cookie file or other text files stored on the user's computer that is provided as part of the web browser. As a result, the user's security is increased without increasing the level of information required to be input by the user.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A user validation system for validating a user to access a server system, the user validation system comprising:
   an encryption module for generating enhanced security data by encrypting first received user access information and data contained in a first cookie associated with a first access of the server system by the user using an encryption function;
   a storage module for storing the enhanced security user access data at the server system; and
   a validation module for receiving, during a second access of the server system by the user, second user access information and a second cookie, and for validating the user for the second access of the server system by comparing the stored enhanced security user access data to a result of the encryption function produced using the second user access information and content retrieved from the second cookie as inputs to the encryption function;
   wherein the encryption module, storage module and validation module of the user validation system are implemented within the server system.

2. The system of claim 1, wherein the first user access information comprises at least one of a user name and a password, and the second user access information comprises at least one of a user name and a password.

3. The system of claim 1, wherein the encryption function comprises a hash function.

4. The system of claim 3, wherein the encryption function applies a hash function to at least a portion of the data contained in a respective cookie and at least a portion of the first received user access information corresponding to the respective cookie.

5. The system of claim 1, wherein the first cookie is stored on a user system in conjunction with the first access of the server system by the user;
   further comprising a cookie generator to generate a new cookie for transmission to the user, the new cookie to replace the first cookie stored on a user system in conjunction with the first access of the server system by the user.

6. A method for validating a user to access a server system, the method comprising:
   at the server system:
      encrypting first received user access information and data contained in a first cookie associated with a first access of the server system by the user using an encryption function to generate enhanced security user access data;
      storing the enhanced security user access data at the server system;
      during a second access of the server system by the user, receiving second user access information and a second cookie; and
      validating the user for the second access of the server system by the user by comparing the stored enhanced security user access data to a result of the encryption function produced using the second user access information and content retrieved from the second cookie as inputs to the encryption function.

7. The method of claim 6, wherein the first received user access information comprises at least one of a user name and a password, and the second user access information comprises at least one of a user name and a password.

8. The method of claim 6, wherein the encryption function comprises a hash function.

9. The method of claim 6, wherein the encryption function applies a hash function to at least a portion of the data contained in a respective cookie and at least a portion of the first received user access information corresponding to the respective cookie.

10. The method of claim 6, further comprising during the second access of the server system by the user, generating a new cookie for transmission to the user, the new cookie to replace the cookie stored on a user system in conjunction with the first access of the server system by the user.

11. A method for validating a user comprising, at a server system:
   during a first access of the server system by the user, receiving first user access information, obtaining first data to be included in a cookie;

generating a first cookie associated with the first access, the first cookie containing the first data, providing the first cookie to the user, encrypting the received first user access information using an encryption function to generate enhanced security user access data, wherein inputs to the encryption function include both the first user access information and the first data contained in the first cookie, and storing the enhanced security user access data at the server system; and during a second access of the server system by the user system, receiving second user access information and content retrieved from a second cookie, and validating the user for the second access of the server system by comparing the stored enhanced security user access data to a result of the encryption function produced using both the second user access information and the content retrieved from the second cookie as inputs to the encryption function.

12. The method of claim 11, wherein the validating further comprises:

encrypting the second user access and cookie information received during the second access using the encryption function to generate encrypted user access data.

13. The method of claim 11, wherein the first and second user access information each comprises at least one of a user name and a password.

14. The method of claim 11, wherein the encryption function comprises a hash function.

15. The method of claim 11, wherein the encryption function applies a hash function to a first input comprising at least a portion of the data contained in the cookie or cookie information and a second input comprising at least a portion of the first or second user access information.

16. The method of claim 11, further comprising during the second access of the server system by the user, generating a new cookie for transmission to the user, the new cookie to replace the cookie stored on a user system in conjunction with the first access of the server system by the user.

* * * * *